UNITED STATES PATENT OFFICE 2,284,504

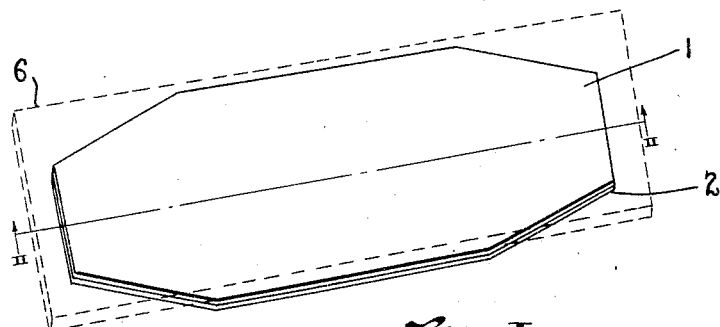
Fig. I
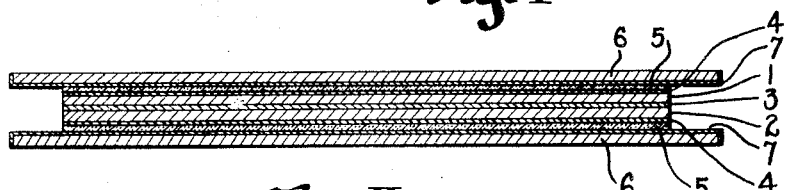
Fig. II
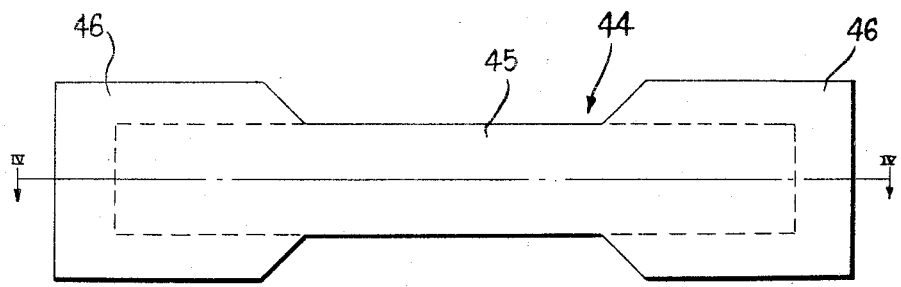
Fig. III
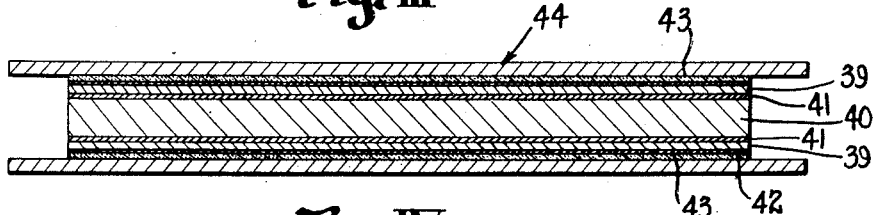
Fig. IV
INVENTOR.
TRACY C. JARRETT
WILLIAM J. WRIGHTON
BY Harry H. Styll.
ATTORNEY.

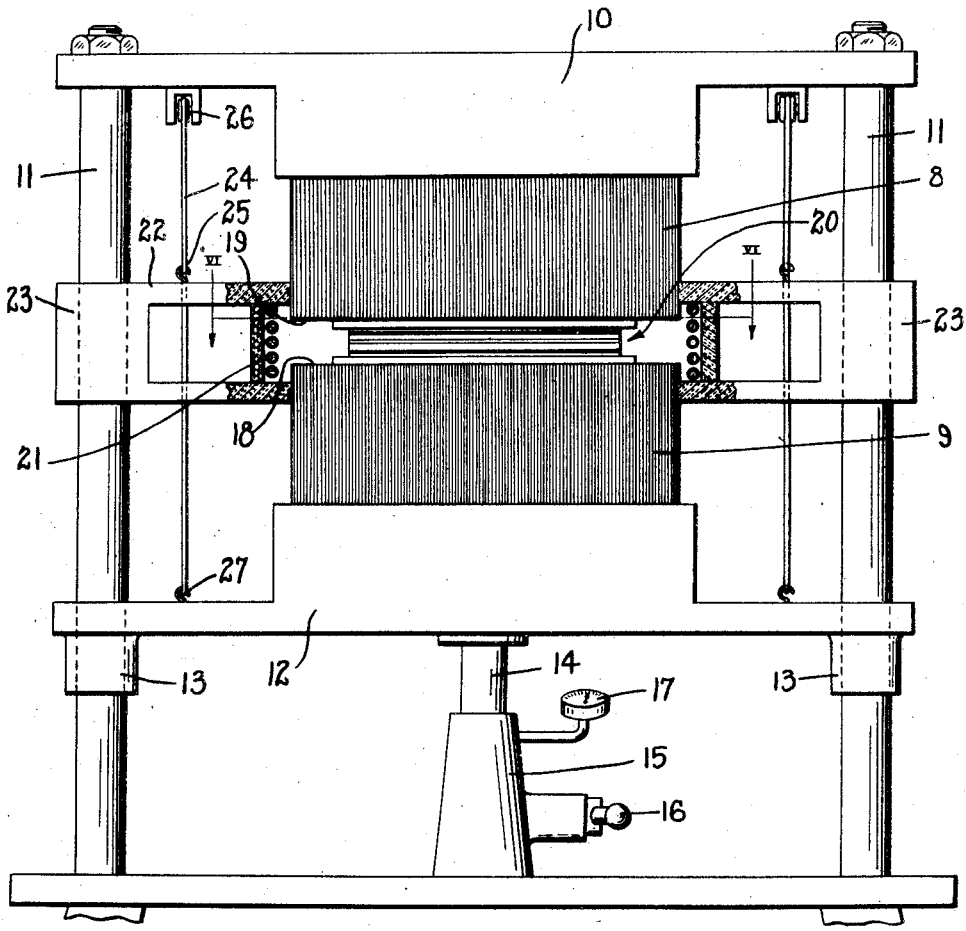
Fig. V
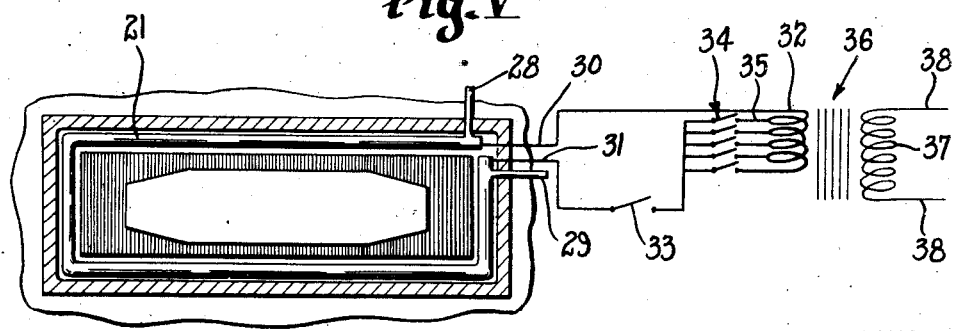
Fig. VI
INVENTOR.
TRACY C. JARRETT
WILLIAM J. WRIGHTON
BY Harry H. Styll
ATTORNEY.

COMPOSITE LAMINATED PLATE STOCK

William J. Wrighton and Tracy C. Jarrett, Southbridge, Mass., assignors to American Optical Company, Southbridge, Mass., a voluntary association of Massachusetts Application May 5, 1939, Serial No. 271,970

4 Claims. (Cl. 29—181)

This invention relates to a metallic laminated composite plate.

Another object is to provide a composite solder united laminated structure wherein the solder is of substantially uniform thickness throughout, and an assembly which is substantially uniform and workable in subsequent reduction without separation of the constituent parts.

Other objects and advantages of the invention will become apparent from the following description taken in connection with the accompanying drawings and it will be apparent that many changes may be made in the details of construction, arrangement of parts and steps of the process shown and described without departing from the spirit of the invention as expressed in the accompanying claims. The invention, therefore, is not limited to the exact details of construction, arrangement of parts and steps of the process shown and described, as the preferred forms only have been given by way of illustration.

Referring to the drawings:

Fig. I is a perspective view of a composite laminated structure embodying the invention;

Fig. II is a sectional view taken along a line simulating line II—II of Fig. I showing the assembled parts before the parts have been treated and integrally joined;

Fig. III is a plan view of a modified form of assembly, such as shown in Fig. II, illustrating a modified form of conductor distributors;

Fig. IV is a sectional view similar to Fig. II illustrating a modified form of the invention;

Fig. V is a diagrammatic side elevation of the apparatus used in heating and integrally joining the laminated assembly, with portions thereof shown in cross section; and Fig. VI is a fragmentary sectional view taken as on line VI—VI of Fig. V with a diagrammatic illustration of the transformer and current control of the heating unit of said apparatus.

It has been usual, in the past, to assemble the laminations which were to be joined in a manner generally similar to the present invention but such assembly was merely held by separate clamp means which functioned only to hold the parts in place for subsequent handling. The assembly held by said clamps was placed in a furnace heated by gas or the like. These prior art furnaces were of such a nature that the heating of the lamination was by radiation and conduction and required a relatively long interval of time to produce substantially uniform distribution of heat. With this prior art arrangement of heating the clamps and other supporting means for the assembly were also necessarily heated. After such heating the laminated assembly was removed from the furnace and placed under a separate press. This shifting of the laminated assembly from the furnace to the press had to be carried out in a relatively short interval of time so as to avoid having the parts cool sufficiently to cause the solder, used in uniting the parts, to congeal prior to being subjected to pressure and also introduced the danger of having the parts move out of desired aligned relation with each other. With such prior art procedure, particularly when gas furnaces or the like were used, heat temperatures could not be accurately controlled. There was inherent danger of the work becoming overheated with the result that the solder was burned or, in instances when a precious metal layer was being joined with a base layer, the metal would become too soft or molten. With such prior art procedures uniform pressures could not be applied while heating. All of these difficulties endangered the making of uniform solderings and in many instances during subsequent working of the joined laminations, the solder bond would not resist such workings and allowed portions of the laminations to become disunited.

The essence of the present invention, therefore, is to overcome all of the above difficulties by providing novel means and method of solder uniting metallic laminations whereby the heat may be definitely controlled and substantially equally distributed throughout the laminations during said soldering and whereby pressure may be simultaneously applied to the laminations during said soldering operations.

Referring more particularly to the drawings wherein like characters of reference designate like parts throughout the several views, a solder united assembly embodying the invention is illustrated in Fig. I. This assembly comprises a layer of precious metal 1 integrally joined with a layer of base metal 2. The layers 1 and 2 are preferably joined by a hard solder, particularly when the layer 1 is of gold and the layer 2 of inferior metal. The resultant article thus formed is adapted to be subjected to a series of subsequent operations, such as rolling, drawing, shaping and so forth, so that a plated material having an outer precious metal coating thereon results which may be fabricated into articles of commerce. The layers 1 and 2, prior to being solder united, are assembled as illustrated in Fig. II. This figure illustrates the assembly just prior to its being placed in the heating device. In forming this assembly a layer of solder 3 is placed between the layers 1 and 2. It is to be noted that the surfaces to be joined by the solder are cleaned and properly fluxed. For ease of description let use assume that a precious metal layer 1, such as gold, is being joined with a layer 2 of copper base alloy. In this instance, a layer 3 of silver solder or the like is used and the surfaces of the plates 1 and 2 to be joined, as well as the surface of the solder layer 3, are cleansed as by sanding, scraping or the like. The surfaces are then treated with a suitable flux, such as boric acid or other known suitable fluxes. The opposed sides of the sandwich thus formed are provided with a relatively thin layer of paper 4. Directly superimposed to said layers 4 there is provided layers 5 of heat resisting material such as asbestos or the like which are of a controlled given thickness. There is superimposed on these heat resisting layers 5, plates 6 of copper or the like of controlled given thickness. The plates 6 are preferably provided with an inner facing 7 of stainless steel which lies between said plates 6 and the heat resisting layers 5. To insure proper bonding at the edges of the assembly the said edges may be given a coating of a similar flux as that used on the surfaces. The assembly thus formed is then placed in a heating and compressing device, such as illustrated in Fig. V. This heating device comprises a pair of jaws 8 and 9. The jaw 8 is supported by a bracket 10 of insulating material which is supported in a relatively stationary position by uprights 11. The lower jaw 9 is supported by a bracket 12 of insulating material. Said bracket 12 has bearings 13 slidably mounted for longitudinal movement on the uprights 11. The jaw 9 is moved toward the jaw 8 by the plunger 14 of a hydraulic compression pump 15. The hydraulic compression pump 15 is manually operated by a lever 16, or may be of an automatic type if desired. A suitable indicator 17 is provided for indicating the amount of pressure. The jaws 8 and 9 act as the inductance concentrator of the heating unit and are formed of transformer iron laminations, that is, of a plurality of relatively thin metal plates held in superimposed relation with each other. The plates of the jaw 9 are so supported as to provide a plane surface 18 on which the assembly, such as illustrated in Fig. II is placed. The jaw 8 has a similar face 19 which is adapted to engage said assembly. The assembly is illustrated at 20 and comprises the superimposed layers 1, 2 and 3 and the associated layers of material 4, 5 and 6. When the assembly 20 is in position between the jaws 8 and 9, the said jaws are urged towards each other under hydraulic pressure introduced by the pump 15. This pressure is of a controlled amount and is determined by the indicator or gauge 17. The total pressure which has been found from practice to be desirable ranges between 2000 and 3000 pounds. This pressure, between 2000 and 3000 pounds, is suitable for use during the hard soldering of a precious metal layer, such as gold, to a base metal such as copper or nickel silver.

An inductance coil 21, such as shown in Figs. V and VI surrounds the laminations of the jaws 8 and 8 and the assembly 20. This inductance coil 21 is carried by a support 22 having bearings 23 slidably connected with the uprights 11. The support 22 is connected by a steel cable 24 with the bracket 12. The cable 24 is attached at 25 to the support 22 and extends over a pulley 26 carried by the upper bracket 10 and is attached, as illustrated at 27, to the lower bracket 12. When the bracket 12 is lowered the cable 24 is adapted to draw the support 22 upwardly so as to expose the upper face 18 of the jaw 9. When the jaw 9 is moved upwardly the support 22 simultaneously moves in a downward direction. The arrangement is such that when the jaws 8 and 9 are in clamping engagement with the assembly 20, the said assembly will be located substantially centrally of the inductance coil 21. The support 22 is preferably formed of insulation material. The inductance coil 21 is preferably in the form of tubular members containing a cooling liquid, such as water, which flows through an inlet 28. A suitable outlet 29 is provided whereby a continuous flow of the water or cooling liquid takes place. The cooling water is for the purpose of keeping the coil members 21 cool so that the resistance in the coil will be less and the resistance loss less. The tubular inductance coil members 21 are connected through suitable lead wires 30 and 31 to a transformer capable of varying voltages and amperes. The lead wire 30 is connected to one end of the secondary coil 32 of the transformer 36. The lead wire 31 is provided with a line switch 33 of any desirable type. The said lead wire 31 is connected through the said switch 33 to a plurality of switch members 34 which may be selectively opened or closed. These switch members 34 are connected, as by the lead wires 35, to different taps on the transformer coil 32 so that different voltages may be obtained. The primary coil 37 of the transformer 36 is connected by the lead wires 38 to any suitable source of A. C. electrical energy. It is to be noted that the plane of the transformer plates forming the jaws 8 and 9 is at substantially right angles to the longitudinal plane of the assembly 20 and the inductance coil 21. The purpose of this arrangement is to cause a high amperage circulating current in the assembly 20. This circulating current generates heat energy in the assembly 20. The flow of the current passing through the work generates the heat and the extent of this flow is controlled by the switch members 34. Change of distance between the jaws 8 and 9 necessitates a change in the voltage used and is controlled by closing the proper switch 34 of the transformer 36.

The switch 33 may be of the commercially known time switches if desired, whereby the length of exposure of the assembly 20 to the inductance field may be controlled. The assembly, comprising the jaws 8 and 9 and the inductance coil 21, is of the low frequency type, approximately 60 cycles, so that heat is generated in a relatively short time interval. This type transformer and assembly may be designed for any of the commercial power frequencies. Commercial power frequencies are used because of great depth of penetration of the current. With this type of heating unit, maximum useful heat is generated only in the assembly 20. The copper plates 6, which are used in this particular instance, as illustrated by the dash lines in Fig. I, are of rectangular contour, that is, they are somewhat longer than the immediate layers 1 and 2 which are to be solder united. The assembly is such that the copper plates control the distribution of the current in the assembly 1, 2 and 3 so that the heat distribution will be substantially uniform throughout the area of said assembly. By changing the shape of the plates 6 a different distribution of the current in 1, 2 and 3 is obtained so that the shape of said plates is a controlling factor of the substantially even distribution of heat throughout the assembly. The relatively thin sheets of paper 4 positioned between the asbestos layers 5 and the immediate metallic layers 1 and 2, which are to be solder united, are for the purpose of preventing the asbestos layers from adhering to the outer surfaces of the layers 1 and 2.

The stainless steel facings 7 on the copper plates 6 are for the purpose of preventing solder, which might flow outwardly of the assembly, from adhering to the plates 6.

Attention is directed to the fact that the plates 1 and 2, mentioned above, and which are to be solder united, are relatively small in area so that rectangular plates may be used in controlling the field of inductance. The said plates 1 and 2 are so shaped that the end portions are not as wide as the central portion thereof thereby requiring less heat energy at said end portions than is required at the center to obtain substantially uniform heat distribution. Because of the fact that these plates are cut off adjacent the ends, it has been experimentally seen that rectangular copper plates 6 of controlled thickness may be used.

In Figs. III and IV there is illustrated a modified form of the invention wherein opposed precious metal layers or laminations 39 of gold, silver or other desirable materials, are secured to the opposed side surfaces of an inner core of base metal 40, such as nickel, copper alloys and nickel silvers. There is provided, between the layers 39 and the core 40, suitable layers of solder 41. Suitable sheets of paper 42 are positioned between the outer surfaces of the precious metal layers 39 and layers of heat resistance material 43, such as asbestos or the like. In this instance, the plates 44 have a central portion 45 of substantially the same width as the width of the assembly constituting the layers 39 and 40. The ends 46 of said plates 44 are enlarged so as to protrude considerably beyond the opposed ends of said assembled plates which are to be joined. The purpose of this arrangement is to secure a uniform distribution of heat in the layers 39 and 40.

It has been found that the spread of the field of inductance can be definitely controlled in this manner. The plates 44 are preferably formed, as stated above, so as to obtain substantially uniform heat throughout the superimposed laminations 39, 40 and 41. The central portion of the plates 45 is preferably reduced so as to avoid overheating throughout the central areas of the plates 39 and 40. It has been found from past practice that should the plates 44 be formed rectangular in shape; such as illustrated by the dash line 6 in Fig. I, and the said superimposed layers 39 and 40 also formed rectangular in shape, an excessive amount of heat will be generated at the center, that is, heat of a lower intensity will be generated at the ends. In order to balance the distribution of heat, therefore, the plates 44 are reduced in width throughout the central areas thereof. By controlling the width of the central portion 45 in proportion to the width of the ends 46 a substantially uniform amount of heat may be generated throughout the entire layers 39 and 40. The shape of the plates 44, therefore, depends upon the shape of the laminations which are to be solder united. The width of the plates 44 and shape thereof depends entirely upon the nature of the work to be done so that the heat distribution in all instances is substantially uniform.

The solder layers 41 may be of hard or soft solder depending upon the nature of the work and the temperature used for the soldering is controlled accordingly. If a hard silver solder 41 is used the assembly is heated above the melting point of the solder. This is also true for soft solder. Immediately upon the detection of the flow of the solder the electrical current is shut off, either automatically or manually. The assembly is then allowed to cool while held under pressure as introduced by the hydraulic pump 15. It is to be understood that during the soldering operation this pressure is maintained substantially constant.

Improved means and methods set forth above may be used for solder uniting any desirable metallic laminations, but for ease of description the laminations have been specified herein as precious metal layers, such as gold, solder united with a base metal.

The solder united assembly or composite structure is adapted to be subsequently reduced and shaped by subjecting it to different processing, such as rolling, drawing, shaping and so forth.

The above described means and method of solder uniting superimposed layers or laminations of metal insures a uniform bonding of the precious metal layer to the base metal and the danger of having the bonding break down during subsequent working is materially decreased so that more uniform results are obtained. All of the disadvantages of the prior art means and methods previously mentioned are eliminated and positive means for controlling the heat temperature and pressure on the assembly during the solder uniting thereof is provided.

Due to the fact that a more accurate control, as to heating and so forth, is maintained during the soldering operation the resultant assembly has desirable flexible and workable characteristics. Because of the use of substantially uniform pressure, the solder used in bonding the layers together will have a substantially uniform thickness so that the layers have substantially uniform working characteristics during the subsequent processing thereof.

The preferred method of controlling the current distribution in the pieces to be soldered together, has been disclosed. There are various other methods which may be used, such as changing the distribution of the iron in the pole pieces, either by pulling the pole pieces out and filling with inert material, by making sections adjustable with the rest or by any other method by which this distribution can be changed.

Although we have shown and described the use of water cool inductance coils it is to be understood that a suitable U-shaped core might be used to carry the magnetic lines of force to the pole pieces with the clamping pole pieces positioned adjacent the ends of each of the branches of the U-shaped member. The inductance coil in this instance would be wound on the base of the U and could be an ordinary wire winding with no water cooling. In the latter instance a separate transformer would not be necessary as the immediate inductance coil could be designed so as to go directly on the line and tapped for current strength necessary. The disclosure relating to such matter, therefore, is only by way of illustration. The method which has been found to be very successful is the preferred type illustrated in the drawings.

From the foregoing description it will be seen that simple, efficient and economical means and methods have been provided for accomplishing all of the objects and advantages of the invention.

Having described our invention, we claim:

1. A composite laminated plate of given dimensions having a sheet metal core of an alloy consisting essentially of copper and nickel bonded to sheets of solder and gold on at least one side thereof, said sheets being of substantially uniform thickness joined throughout their interfaces with substantially uniformly constant holding strength at each point thereof, as the result of the application of substantially uniform heat and pressure during said joining by the layer of solder material of substantially uniform thickness throughout its area, said plate being adapted to be processed so as to alter the said dimensions thereof and to have substantially constant resistance to said processing throughout said layers.

2. A composite laminated plate of given dimensions having a sheet metal core of an alloy consisting essentially of copper bonded to sheets of solder and gold on at least one side thereof, said sheets being of substantially uniform thickness joined throughout their interfaces with substantially uniformly constant holding strength at each point thereof, as the result of the application of substantially uniform heat and pressure during said joining by the layer of solder material of substantially uniform thickness throughout its area, said plate being adapted to be processed so as to alter the said dimensions thereof and to have substantially constant resistance to said processing throughout said layers.

3. A composite laminated plate of given dimensions having a sheet metal core of an alloy consisting essentially of nickel bonded to sheets of solder and gold on at least one side thereof, said sheets being of substantially uniform thickness joined throughout their interfaces with substantially uniformly constant holding strength at each point thereof, as the result of the application of substantially uniform heat and pressure during said joining by the layer of solder material of substantially uniform thickness throughout its area, said plate being adapted to be processed so as to alter the said dimensions thereof and to have substantially constant resistance to said processing throughout said layers.

4. A composite laminated plate of given dimensions having a sheet base metal core bonded to sheets of solder and a precious metal on at least one side thereof, said sheets being of substantially uniform thickness joined throughout their interfaces with substantially uniformly constant holding strength at each point thereof, as the result of the application of substantially uniform heat and pressure during said joining by the layer of solder material of substantially uniform thickness throughout its area, said plate being adapted to be processed so as to alter the said dimensions thereof and to have substantially constant resistance to said processing throughout said layers.

WILLIAM J. WRIGHTON.
TRACY C. JARRETT.